(12) United States Patent
Arigoni

(10) Patent No.: US 7,210,498 B2
(45) Date of Patent: May 1, 2007

(54) "TOILET KING" AUTOMATIC WATER LIMITING SUPPLY SHUT OFF SAFETY VALVE FLO-CONTROL

(76) Inventor: John Henry Arigoni, 924 River Rd., Clarksburg, MA (US) 01247

( * ) Notice: Subject to any disclaimer, the term of this patent is extended or adjusted under 35 U.S.C. 154(b) by 0 days.

(21) Appl. No.: 11/090,602

(22) Filed: Mar. 26, 2005

(65) Prior Publication Data
US 2005/0217737 A1    Oct. 6, 2005

Related U.S. Application Data

(60) Provisional application No. 60/560,003, filed on Apr. 6, 2004.

(51) Int. Cl.
*F16K 21/00* (2006.01)
(52) U.S. Cl. ..................... 137/624.14; 4/378
(58) Field of Classification Search .......... 137/624.14, 137/624.12, 614.2; 4/378, 379
See application file for complete search history.

(56) References Cited

U.S. PATENT DOCUMENTS 1,841,433 A * 1/1932 Finnegan ............... 137/624.12
4,193,145 A * 3/1980 Gross et al. ........... 137/624.14

* cited by examiner

Primary Examiner—Kevin Lee
(74) Attorney, Agent, or Firm—Malcolm J. Chisholm, Jr.

(57) ABSTRACT

A geared mechanical device designed to limit a finite amount of water per flush to a tank reservoir of the common household toilet, providing positive shutoff of flow and anti-siphon back flow prevention. The toilet is flushed, the actuator lever opens the flo-control valve stopper by means of linkage to the flush lever. The water enters the back flow chamber into the primary valve chamber thence to the flow control chamber, and on to the float valve into the toilet tank for fill up. Force of the water rotates the drive impeller gearably linked to the hold release mechanism. On release the flo-control valve stopper closes. The back flow prevention chamber allows the water to pass in the direction of flow and reseats itself when the flow has stopped or if water pressure is lost at any time eliminating a need for a anti-siphon tube. A replenish tube restores water level to the bowl. A water delivery chamber may be affixed to the flo-control in place of the float valve. For the purpose of adjusting the volume of water per flush a modified slotted disk hold release mechanism is used in the flo-control, gearably connected to the drive impeller.

12 Claims, 4 Drawing Sheets

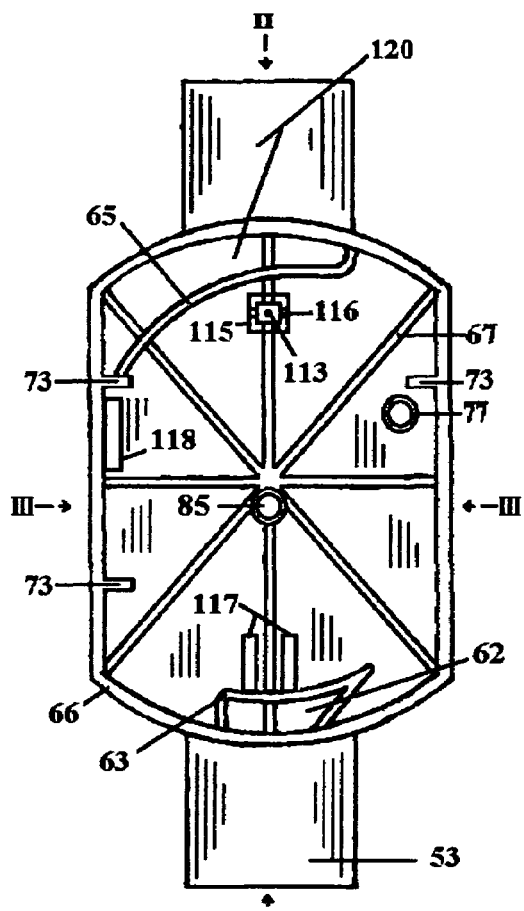
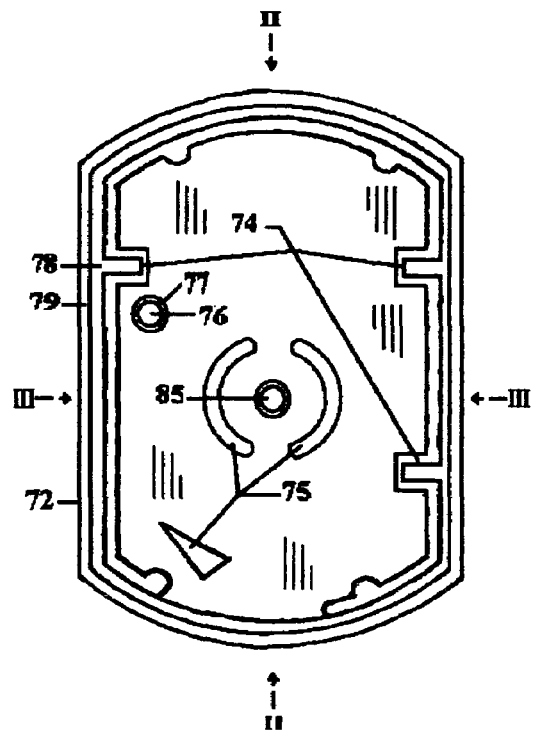
Fig. 5
Fig. 5A
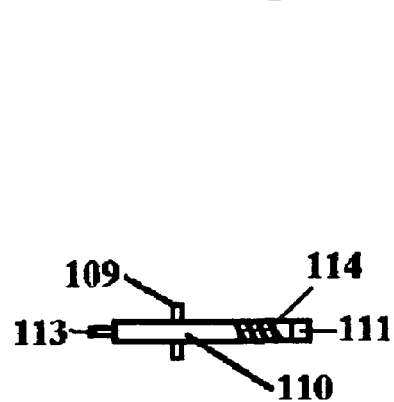
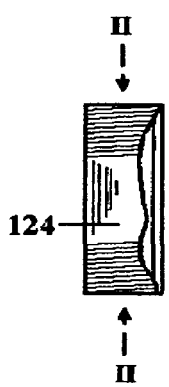
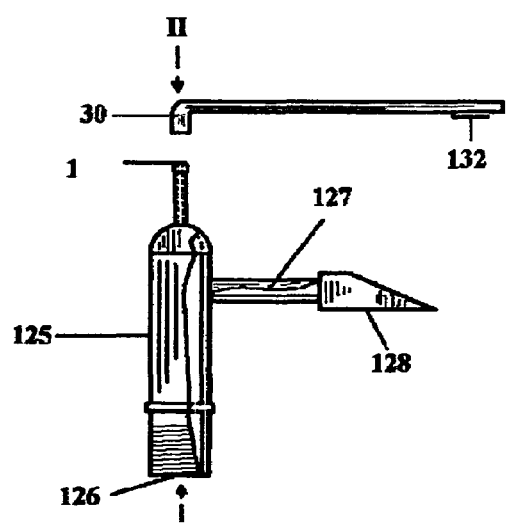
Fig. 6
Fig. 7
Fig. 8

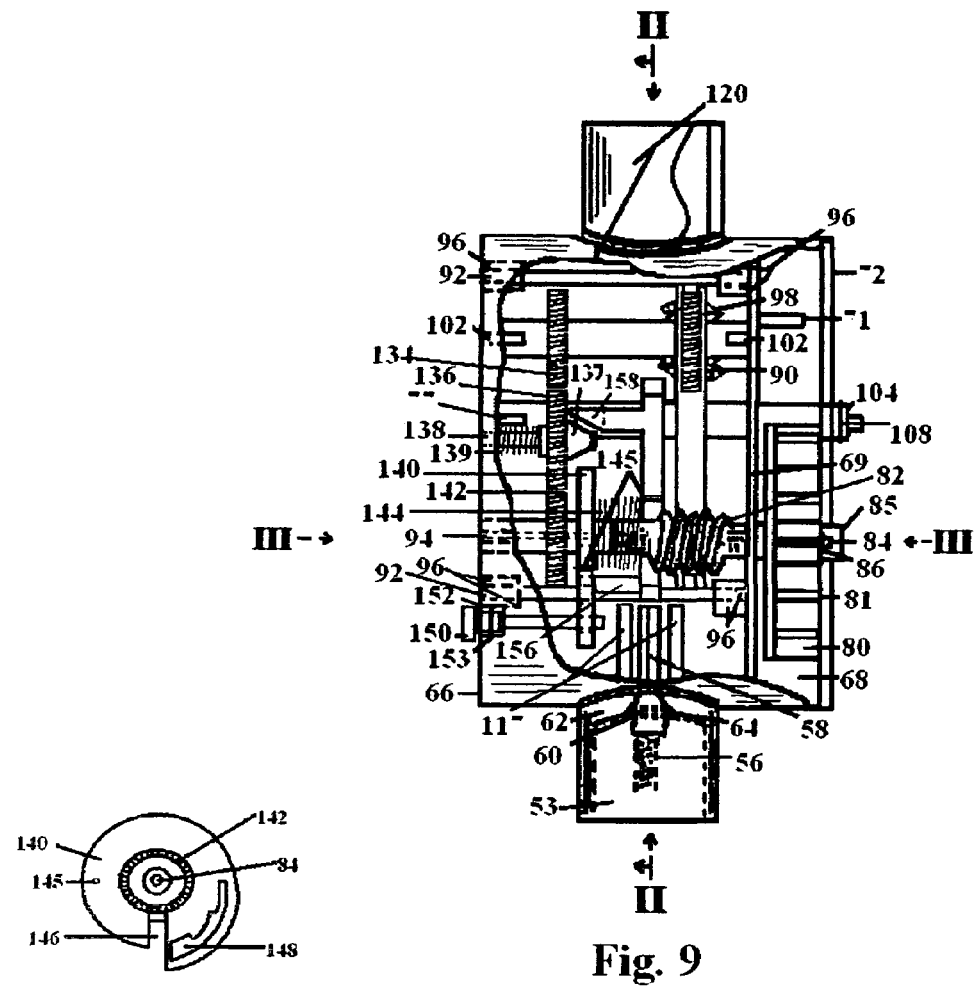
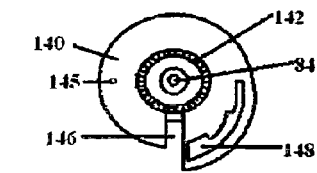
Fig. 9
Fig. 9 A
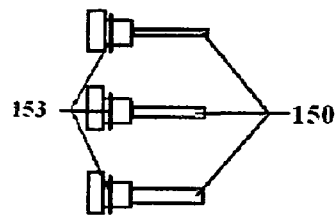
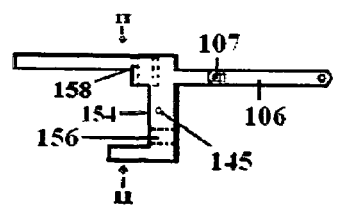
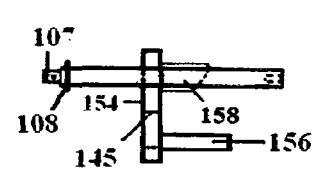
Fig. 9 B          Fig. 9 C          Fig. 9D

"TOILET KING" AUTOMATIC WATER LIMITING SUPPLY SHUT OFF SAFETY VALVE FLO-CONTROL

I, claim priority filing date of Apr. 6, 2004 of provisional Application No. 60/560,003

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND FIELD OF INVENTION

Personal use and flapper failure of common tank type toilets used in households in the United States

REFERENCES CITED U.S. PATENT DOCUMENTS

"The present invention relates to the fill valve of ordinary toilets with holding tanks or reservoirs, more specifically to improve and expand the scope and function of the toilet fill valve addressing the issues of water shut off, water conservation and preservation, water damage prevention, anti-siphon and back flow prevention."

DISCUSSION OF PRIOR ART

Toilet systems, of the reservoir tank type generally installed in American homes, are connected to the potable water supply. The average American home has at least one of these toilets, each of which uses approximately one and one half to three and a half gallons, or more, of water per flush, depending on the age of the toilet.

Generally, toilet fill valves are made with a float mechanism causing the valve to open when the toilet is flushed as the water leaves the tank and to close once the float is lifted by the water when flush valve closes and the tank or reservoir becomes full.

Typically these toilet fill valves work fairly well but have several drawbacks that lead to wasting of water, over flow and leaks. These drawbacks result in a myriad of problems from wells running out of water, dirt being introduced into the water lines from low water levels in shallow wells, and septic system failure, to high water and sewage bills for those on public water supply and sewage systems to water damage to the floor of a bathroom, and ceilings and walls of a downstairs room.

To address these issues manufacturers and inventors began to develop other types of toilet fill valves such as the "Toilet Tank Water Flow Shutoff Apparatus For Preventing Leakage And Overflow, U.S. Pat. No. 5,524,299 of Dalfino, which uses tilting trays to control water level and shutoff of the water supply. Though this device can effectively cause shut off, it tends to have many external moving parts subject to mechanical failure and also uses most of the toilet tank area and servicing as well as installation require more intensive labor and increased expense.

A quite different approach is taken with the Revised Automatic Water Shut Off For Stuck Open Flush Valves In Toilet Water Tanks, U.S. Pat. No. 5,440,765 of Weir, which utilizes a two cylinder system to force the float upwards to shut off the water supply should a continuous flow or wasting of water occur. Similar to the above is the Toilet Bowl Automatic Flow Shut Off and Water Saver Device, U.S. Pat. No. 4,901,377 of Weir, that accomplishes the same results with a bellows assembly that lifts the float when the tank remains empty for a period of time beyond that of normal flushing. Both of the foregoing devices utilize a large portion of the toilet tank area to the right of the flapper valve causing access to the flapper to be flanked on all sides and tends to limit service space for repairs, causing repairs to be costly and labor intensive.

Addressing the issues of conservation, the Water Conserving Toilet Flush Control, U.S. Pat. No. 5,031,254 of Rise, is a device that addresses preventing the wasting of water achieved by limiting the lifting action of the flapper and restricting or preventing automatic operation of flushing. Relatively similar in operation the Water Conserving Toilet Flapper Valve Control, U.S. Pat. No. 5,185,891 of Rise, which in effect limit's the height that the flapper can be lifted achieving the same results as the prior invention of Rise when the flush lever is activated. Though both Rise controls address stopping automatic function of the flapper and limiting the flappers movement they do not address wasting of water when the flapper becomes defective by means of blowout, tear or just ordinary wear of the seal, the results which could lead to a continuous loss of water to the sewer or overflow and water damage.

Fill valves designed to save water such as the Toilet Water Preservation Device U.S. Pat. No. 5,230,104 of Ocampo, tend to use the flow of wasting water redirecting it to a secondary float device that in turn lifts the primary float device. This device though it appears to be quite functional also renders much the same results as the Weir devices utilizing or cluttering tank space hindering and causing labor intensive costly service when repairing or replacing the flapper or primary float valve. The secondary float fill valve is also still subject to fail in much the same way as the primary float fill valve.

Adaptations to fill valves such as the Shut-off Device For The Float Valve Assembly Of A Toilet, U.S. Pat. No. 5,752,281 of Conner, designed so that the rotation of the lever arm causes the float valve assembly to rotate to a stop position and stop the flow of water to the toilet tank in the event that the float fails to raise up for any known reason appears as an entirely different approach. While this system would effectively shut off the flow of water it is possible that with the rotating movement of the float assembly, it could eventually cause leakage and overflow from wear due to excessive movement.

Most of these devices work fairly well shutting off the water, while addressing anti-siphoning of water but do not adequately address back flow prevention, wasting of water if the float fails to be elevated by the water or lack thereof, and or over flow of the bowl or a leaky gasket between tank and bowl. Recently developed toilet fill valves address one or more of these problems. One of the more recent toilet fill valves the FlowManager™ AquaOne Technologies, Inc., addresses most of these problems, incorporates the use of electronic water sensors that detect leaks and overflow. The major drawbacks of such devices are that they require regular and periodical battery maintenance and replacement as well as regular cleaning of the sensor devices that appear as necessary clutter and are actually in the way of cleaning the bowl and or the floor. Additionally, the cleaning of the sensors and the chemicals used, both cleansers and antibacterial toilet additives can cause premature failure. Although the sensor in the bowl will effectively stop overflow of the bowl or bowl in households with children who might lose a toy or otherwise plug the bowl, a floor sensor could present a problem with flushing where bath water is accidentally splashed on it or if a child accidentally misses the bowl and wets the sensor. Electronic valve systems such as the above generally utilize a normally open solenoid valve so the batteries will last a long time if the valve is not triggered shut by a sensor, however if the valve is triggered shut in the case of a flapper leak the batteries would not last very long which would in short time lead to water running to the sewer or worse yet water damage if the bowl was plugged.

Addressing the issues of toilet tank fill and flush problems and wasting of water with control devices has made significant progress in the Positive Shut-off, Metered Water Control System For Flush Tanks, U.S. Pat. No. 4,916,762, by Shaw. This device utilizes the flow of water to turn a vaned water wheel. A worm gear attached to the water wheel drives a spur gear which in turn rotates a second spur and worm gear. The worm gear of the secondary or intermediate gear assembly then engages a spur gear seated in a ratchet and cam assembly. The cam of the ratchet cam assembly controls both opening and closing of a stopper. The cam is ratcheted to the start position by a lever connected to the flush lever of the toilet to cause the stopper to dislodge from its seat when the toilet is flushed to allow water to pass or flow driving the water wheel which causes the cam to turn and reseat the stopper after the desired amount of water has been metered through the system. Although this device is impressive it has the possibility of lockup of the drive system if there is no particle screen at the inlet to stop foreign particles that can cause premature wear and lodging within the gears.

Helical gears are similar to spur gears and of the same family of gears, however the teeth of a helical gear are angled to the gear face to better mesh with the driving worm gear insuring greater performance while preventing binding or lockup.

While addressing anti-siphon ability as with the other devices heretofore mentioned this particular device also addresses back flow prevention when the stopper is reseated by water pressure, but will not stop back flow if water pressure is lost during fill up. As previously discussed above this invention utilizes a start arm with a pawl to ratchet forward the cam to allow a predetermined volume of water by notches fixed in the cam. While this method appears to be able to work well a shortcoming to address is each toilet with a different tank capacity would need a special cam for that particular volume of water, additionally this ratchet cam system does not address the ability to adjust the volume of water metered so a 3.5 gallon valve will not service the 1.5 gallon tank of a newer toilet or vise versa. In other words one size does not fit all due to the arrangement of the fixed setting or position of notches in the cam and the ratcheting mechanism.

SUMMARY OF THE INVENTION

Accordingly, the reader will see that the instant invention is a toilet fill valve designed to operate in conjunction with or without its float assembly by providing a limited amount of water to any given toilet tank during flushing sufficient to allow a complete flush and performing a positive shut off of the water supply should the flushing operation fail for any reason. Should the float or flapper fail to operate properly and only after the maximum amount of water limited by volume has passed to the tank of a toilet, or water closet, the flo-control valve of the instant invention will close and prevent further entry of water into the tank for the purpose of eliminating running or wasting of water, preventing over flow and water damage. Additionally the fill valve is equipped with a back flow prevention check valve to stop any possible reverse flow in case of water pressure loss. The volume limiting shut-off action of the flo-control system, which can be used on any common toilet tank of sufficient dimension, comprises a flo-control valve positioned to turn on and shut off the flow of water from the feed line to the tank. The water flows from the feed line into the inlet through a channel in which the flo-control valve stopper is positioned, flow continues to a vaned water driven impeller assembly and thence to the inlet section of a float valve or a water delivery chamber and on to the outlet of whichever is used such that, during water flow the water driven impeller is caused to rotate within a channeled flow chamber. A worm gear, attached to the water driven impeller rotating therewith then drives a helical spur gear that is part of a vertical secondary gear assembly having a second worm gear on the upper end thereof. The worm gear of the intermediate gear assembly engages a horizontal helical spur gear of the same dimension which in turn rotates the final drive worm gear, which retracts the hold/release lever. The final drive worm gear, and the hold/release lever, control the positioning of the flo-control valve stopper in either a hold open or a released closed position.

When the toilet is flushed, the actuating lever depresses and dislodges the flo-control valve stopper to start the flow of water to fill the toilet tank. When the flo-control valve stopper is depressed the actuator lever causes the hold/release lever to disengage and retract from the final drive worm gear allowing the actuator lever to drop below the hold/release lever. When the flush lever is released the upward movement of a spring connected to the lower portion of the flo-control valve stopper causes the hold/release lever to engage the final drive worm gear while leaving the flo-control valve stopper open.

The water flows through the inlet, past the open flow-control valve stopper on to the impeller causing it to rotate. The rotating impeller then drives the gear assembly to cause the final drive worm gear to retract the hold/release lever releasing and allowing the actuator lever to be elevated by the closing of the flo-control actuator valve stopper, thereby effectively shutting off the flow of water. Noting that the shutting off the flow of water by the flo-control valve stopper is dependant on the failure of one or more of the flushing components of the toilet tank after allowing the full volume of water allowed or limited by the flo-control. An alternate means of controlling the actuator release is achieved by removing the hold release lever system and replacing it with a slotted disk system utilizing the same embodiment and majority of the components with some alterations which will be discussed further on.

Ideally the float assembly affixed to the uppermost portion of the valve body will be activated prior to the closing of the flo-control valve stopper. The flo-control valve will reset to its maximum allowance of water volume each time the flush lever is depressed. Any toilet tank that has a lesser volume capacity will cause the float valve to elevate and effectively shut off the flow of water. Should the float or flapper fail to close, the tank would call for more water than allowed and the flo control valve will shut off the flow of water when the limited volume of water has been reached effectively conserving water and reducing the volume of sewage waste caused by toilets that continuously run. In effect and operation the function of the instant invention is to shut off the water supply upon any malfunction of the toilet flushing system for any reason.

The reader will note that there are two interchangeable water delivery systems one being a float assembly and the other being a water delivery chamber. When using a float assembly the flo-control can be used universally in any tank irregardless to a lesser tank capacity. For instance a 1½ gallon tank will cause the float to shut the flow of water off at 1½ gallons and the flo-control will stop running. If there is a flapper leak or other malfunction the flo-control will still shut off at 3½ gallons limiting the maximum flow of water as its intended safety feature. The flo-control will also reset to its maximum allowance at every flush.

Said water delivery chamber system attaches to the flo-control the same way as the float assembly. However this system is simply a channeling device that directs the water downward towards the base of the tank for fill up from a delivery tube, with a replenish tube nipple at its upper most portion for removable connecting the replenish tube to restore the water level in the bowl during fill up.

OBJECTS AND ADVANTAGES

Accordingly, being designed to address the problems of toilets that have been discussed with the prior art, several objects and advantages of the present invention are:
(a) to provide a limited supply of water by volume to any given toilet tank per flush;
(b) to provide a failsafe positive shutoff of the water feed line when the maximum limit of water by volume has been reached;
(c) to prevent overflow and limit the extent of water damage from a plugged toilet;
(d) to conserve water, and to prevent wasting of water;
(e) to reduce municipal waste water treatment costs;
(f) to reduce the production of sewage pollution into the environment;
(g) to provide a positive means of anti-siphon and back flow prevention.

Further objects and advantages are to provide a cost effective easy to install toilet fill valve that will not interfere with servicing of other toilet tank parts. For instance with the present invention should the flapper of the flush valve not seat properly or worse yet rupture the water supply will be shut off and the toilet tank will be left empty and ready for easy no muss or fuss servicing. A new flapper can be installed or the flapper can be adjusted without taking too much time for cleanup, and once the repair is complete all that is necessary to return to normal flushing operation is to activate the flow of water by depressing the flush lever of the toilet tank and your back in business.

BRIEF DESCRIPTION OF SEVERAL VIEWS OF THE DRAWING

The present invention will be better understood from the following detailed description as depicted in the drawings in which like reference numerals refer to like parts; closely related figures have the same number but different alphabetic suffixes.

FIG. 3A is a cutaway view side view of the flo-control valve assembly;

FIG. 3B is a front view of the drive impeller and the impeller drive flow chamber base plate, taken on line II—II and line III—III of FIG. 3A;

FIG. 5 is a interior front view of the flo-control body rear wall, taken on line II—II and line III—III of FIG. 3A;

FIG. 5A is a interior rear view of the flo-control cover, taken on line II—II and line III—III of FIG. 3A;

FIG. 6 is a elevated view of the hold/release lever;

FIG. 7 is a cut away view of the float valve coupling;

FIG. 8 is a front cut away view of a water delivery chamber and replenish tube.

FIG. 9 is a cut away side view of a modified adjustable volume flo-control assembly using a slotted disk release system;

FIG. 9A is a rear view of the slotted disk and gear for the slotted disk release system;

FIG. 9B is a side view of the adjusting pegs for the slotted disk release system;

FIG. 9C is a front view of the replacement actuator for the alternate volume flo-control release system taken on line II—II of FIG. 3A, for the slotted disk release system;

FIG. 9D is a side view of the replacement actuator for the slotted disk release system;

DETAILED DESCRIPTION OF THE INVENTION

The following description is provided to enable any person skilled in the art to make and use the invention and sets forth the best modes contemplated by the inventor for those so skilled to do so.

Figure 1:
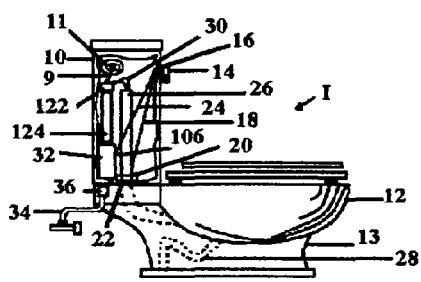
FIG. 1 is a side view of a typical conventional toilet, with the tank partially cut away to reveal its interior, incorporating the automatic water limiting, supply shut off valve of the present invention.
Figure 2:
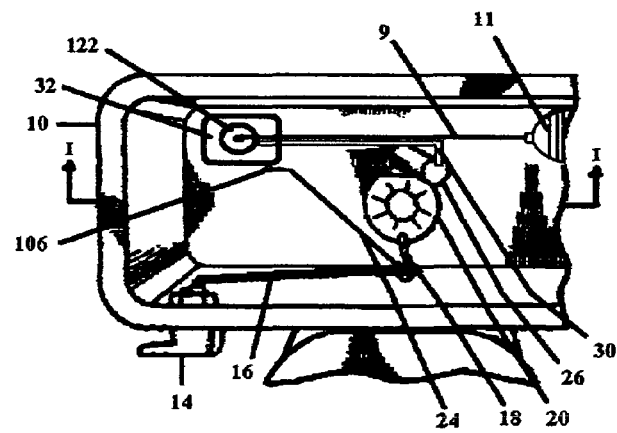
FIG. 2 is a top plan view of the principal portion of the toilet tank of FIG. 1 with the lid removed, taken on line I—I of FIG. 1.

FIG. 1 is a side view of a conventional toilet, of the type universally found in most homes in the United States and North America, which is fitted with a water limiting flo-control valve 32, in accordance with the present invention In the conventional home toilet, a float valve assembly 122, comprising a float rod 9, and a float 11, FIGS. 1 and 2, mounted at the upper end of a float valve assembly 122, for closing the valve by means of linkage to the float 11, with float rod 9, when the tank is filled to a predetermined level. In the present invention a float valve assembly 122, is affixed to the uppermost portion of the water limiting flo-control valve 32, by means of a float coupling 124.

The illustrated toilet comprises a toilet bowl 12, and a pedestal 13, with a tank 10, mounted over the rear extension of toilet bowl and pedestal 13. Water supply is introduced by means of a water feed line 34, which is connected by known means of a standard sized fitting, commonly used with flush tanks, providing a sealable mount to the tank 10, and a inlet fitting 36, of the water limiting flo-control valve 32. Water received in tank 10 which exceeds the tank's design capacity spills into an overflow tube 26, wherefrom it is discharged to the bowl 12. The main tank outlet 22, is normally closed by a flapper 20. When water from overflow tube 26, and tank outlet 22, is introduced into toilet bowl 12, the level of water in bowl 12, is raised until it exceeds the waste outlet of a flush trap 28, causing the water to flow from bowl 12, by siphoning action. Water, and waste products, continue to flow from bowl 12, as long as sufficient water enters bowl 12.

FIG. 2 is a top plan view of the principal portion of the toilet tank of FIG. 1 with the lid removed, illustrating the position of a flapper 20, along line I—I of FIG. 1 and the position of the water limiting flo-control valve 32, to the left most bottom portion of the tank 10. A flush handle 14, located in the upper left front area of the tank 10, is depressed to activate the flushing operation of the toilet. When depressed the flush handle raises a flush rod 16, opening a flapper 20, by means of a flexible flapper flush linkage 18, simultaneously said flush rod 16, by means of a flexible flo-control flush linkage 24, connected to a actuator lever flush extension 106, activates the water limiting flo-control valve 32, allowing water to flow to the tank 10.

Figure 3:
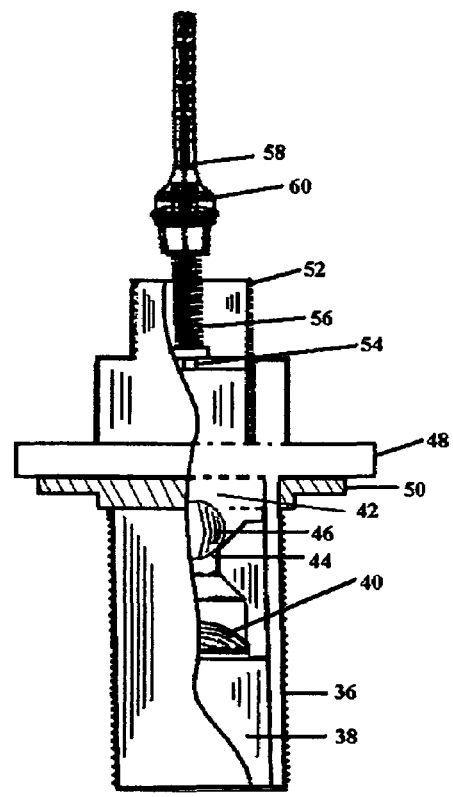
FIG. 3 is a cutaway front view of the inlet fitting, back flow chamber assembly and flo-control valve stopper.
Figure 3:
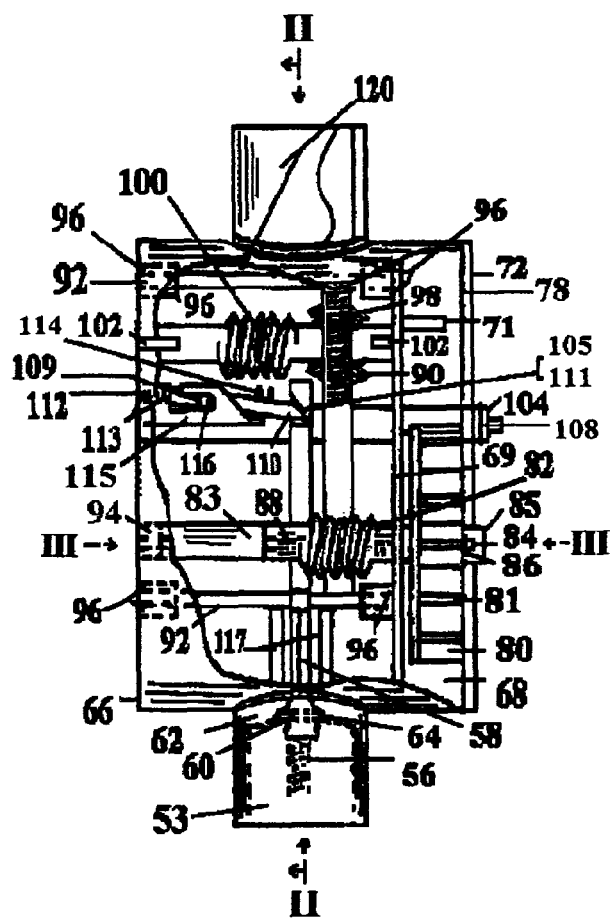
Figure 3:
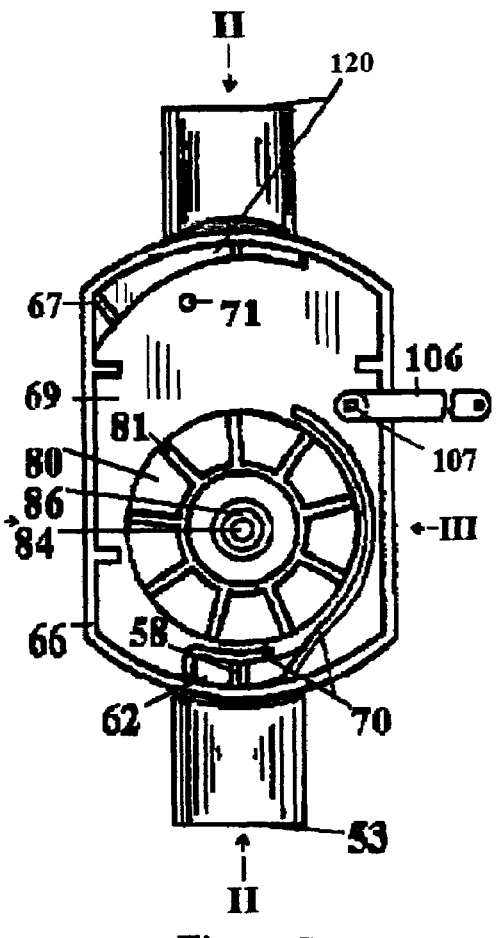
Figure 4:
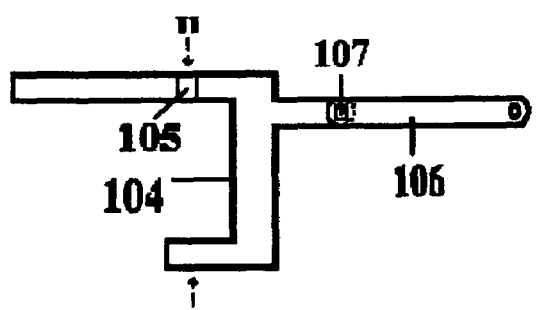
FIG. 4 is a front view of the actuator lever and lever flush extension, taken on line II—II of FIG. 3A.
Figure 4B:
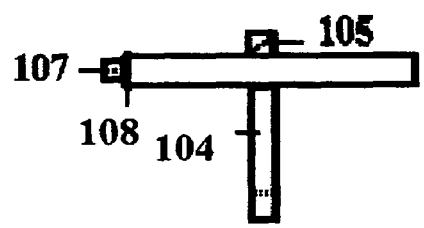
FIG. 4A is a side view of the actuator lever.

FIGS. 3–3B are illustrations of assembled components of the water limiting flo-control valve 32, the Automatic Water Limiting, Supply Shut Off Safety Valve system according to the preferred embodiment of the present invention. The preferred embodiment is intended to limit the passing of up to 3.5 gallons of water by volume to the tank 10, and to shut off the water supply. FIGS. 4–4A are illustrations of the actuator lever 104, and actuator lever flush extension 106. FIGS. 5–5A illustrate partial views of the interior of the flo-control body 66, flo-control cover 72, and the flo-control body seal 78. FIG. 6 illustrates an elevated view of a hold/release lever 110. FIG. 7 illustrates a sectional front view of the float valve coupling 124. FIG. 8 illustrates a water delivery chamber 125, and a replenish tube 30.

The preferred embodiment of the present invention is molded in three sections of a plastic material that may be sealed when joined with o rings or other suitable gasket type threading seal or bonding material of the manufacturers choice. A back flow prevention chamber 42, illustrated in FIG. 3, demonstrates an inlet fitting 36, comprised of a water inlet chamber 38, fitted with a particle screen 40, for trapping any foreign particles that may enter the water supply. Slightly above said inlet chamber 38, molded in the embodiment of the inlet fitting is a back flow prevention chamber 42. A back flow seat 44 is centered in said back flow chamber with a minimum ¼ inch diameter opening for water flow between the inlet chamber 38, and the back flow prevention chamber 42. Freely sitting on said back flow seat 44, is a back flow check ball 46, made of sufficient rubberized or metal material as to be non corrosive, non-buoyant and of sufficient diameter so as to block the opening for the water flow to prevent back-flow without becoming lodged. During water flow, the force of the water will lift the back flow check ball 46, off the back flow seat 44, allowing free flow of the water through the system. When water flow stops or at any time should the water supply lose its pressure the water will cease to flow causing the back flow check ball 46, directed by the tapered wall of the back flow prevention chamber 42, to reseat itself preventing reverse flow of water. At the center portion of back flow prevention chamber 42, a mounting flange 48, of the standard size to fit the receiving hole of the toilet tank 10, fitted with a standard size flange seal 50, of appropriate material between a mounting flange 48, and the tank 10, is affixed or mounted to said tank 10, by means of the standard flange nut not shown for obvious reason.

Threaded into the upper most end of the inlet fitting 36, and sealed by means of suitable plumber joint material or bonding material is a flo-control inlet coupling 52. A flo-control valve stopper 58, fitted with a o ring seal 60, is attached to a open cross spring retainer pin 54, of a flo-control inlet coupling 52, by means of a flo-control valve spring 56, preferably made of a non corrosive material such as stainless steel of sufficient diameter wire to create enough upward pressure to seat and hold said flo-control valve stopper 58, in its closed position while still allowing the flo-control valve stopper 58, to be unseated without excessive force.

The upper most portion of the flo-control inlet coupling 52, is threaded and sealed by means of plumber joint material into a coupling receiver 53. The flo-control valve stopper 58, is positioned vertically within the center most portion of a flo-control chamber 62, of preferred embodiment of the flo-control body 66. FIG. 3A.

Section two preferably molded of a plastic material in two pieces, illustrated in FIG. 3A, FIG. 3 B, FIG. 5, and FIG. 5 A, comprises a flo-control body 66, and a flo-control cover 72, that is sealed by placing a flo-control body seal 78, between the flo-control cover 72, and the flo-control body 66, and placing a actuator o ring 108, in a actuator receiver 77, prior to aligning the actuator with a cover actuator hole 76, then snapping the flo-control cover 72, in place. Sealing of the housing is necessary to create driving water flow and to meet the plumbing requirements for "anti-siphoning". The composition used for flo-control body 66, would be a moldable plastic material of the manufacturers choice.

The flo-control cover 72, FIG. 5, is snapped into place by means of a set of flo-control cover guides 73, mated to said guides by means of a matching set of cover guide receivers 74, held in place by a body/cover locking ridge 7. Said flo-control cover 72, aids in directing the flow of water by means of a cover flow guide 75, that aid in driving the rotation of a drive impeller 80.

Mating of the flo-control valve stopper 58, and a flo-control valve o ring 60, to a flo-control valve seat 64, is accomplished by means of threading the flo-control inlet coupling 52, into the lower most portion of the flo-control chamber 62, of the preferred embodiment of the flo-control body 66, thereby extending the upper most portion of the flo-control valve stopper 58, through the upper most portion of the flo-control chamber 62, between the walls of a lower actuator guide 117.

When unseated by means of a actuator lever 104, the flo-control valve stopper 58, allows water to flow through said valve into the upper most portion of the flo-control valve chamber 62, and on into a impeller drive flow chamber 68, FIGS. 3A and 3B directed by means of a lower body flow guide 63, FIG. 5, creating an opening between said chambers. Preferably molded of a plastic material the components of the impeller drive flow chamber 68, are comprised of a impeller drive flow chamber base plate 69, a flo-control cover 72 seals the flow chamber when snapped into place as previously described. The impeller drive flow chamber base plate 69, directs the flow of water by means of a split flow guide 70, located at the lower most portion of base plate 69, which forces the flow of water to turn a drive impeller 80. The split flow guide 70, FIG. 3 B, is comprised of two parallel walls of sufficient and equal extension at a 90 degree angle outwardly from the face of the impeller drive flow chamber base plate 69, so as to allow sufficient space to form a chamber when covered with said flo-control cover 72, to allow free wheeling of a drive impeller 80. A spacing peg 71, of equal extension molded to the uppermost end of base plate 69, opposite the split flow guide 70, assures equal distance between said impeller drive flow chamber base plate 69, and the flo-control cover 72, at all points.

The impeller drive flow chamber 68, houses the drive impeller 80, FIG. 3B, molded as a one piece unit with a primary drive worm gear 82, to the rear most portion of its center. The impeller primary drive worm gear 82, is centered and mounted through said impeller drive flow chamber base plate 69, by means of a impeller drive shaft 84, composed of a non corrosive metal, mounted horizontally from front to rear with a primary drive shaft bushing 83, to the rear of the primary drive worm gear 82, between a drive shaft receiver 85, recessed in the inside of the flo-control cover 72, and a body drive shaft receiver 94, recessed in the inside of the flo-control body 66, locked in a certain position on said impeller drive shaft 84, by means of a retainer ring 86, as shown in FIGS. 3A and 3B. Said impeller 80, solidly connected to primary drive worm gear 84, is caused to rotate by means of the force of water flow through the impeller drive flow chamber 68, against a impeller fin 81, in the flow path. The impeller fins 81, are evenly space to insure a fin will enter the flow path as a fin leaves the flow path maintaining a constant rotation of the drive impeller 80, during water flow with a minimum of four fins in the flow path at all times FIG. 3B.

The primary drive worm gear 82, engages a secondary drive helical gear 88, solidly molded as a one piece unit with a secondary drive worm gear 90, of a suitable material. Said secondary helical gear meshes with said primary drive worm gear 82, at its 90 degree right center horizontally. Said secondary worm gear 90, is vertically positioned by means of a secondary drive gear bracket 92, Two secondary drive gear brackets 92, are mounted horizontally parallel to each other, one above the other, spaced a sufficient distance apart so as to accommodate the length and fixing the position of said secondary drive helical gear 88, and secondary drive worm gear 90. Said secondary drive gear brackets 92, are mounted from front to back by means of a secondary drive bracket mount 96, molded into the rear most side of the impeller drive flow chamber base plate 69, and the front most inside of the rear wall of the flo-control body 66, illustrated in FIG. 3A.

The secondary drive worm gear 90, then engages a final drive helical gear 98, solidly molded as a one piece unit with a final drive double thread worm gear 100, of a suitable material. Said final drive helical gear 98, meshes with said secondary worm gear 90, at its center 90 degrees to its left and centered above said primary worm gear 82. Final drive double thread worm gear 100, is horizontally positioned from front to back by means of two final drive gear shaft studs 102, one being molded to the rear side of the impeller drive flow chamber base plate 69, 180 degrees horizontally to the other being molded to the front inside of the rear wall of the flo-control body 66, spaced a sufficient distance apart so as to accommodate the length and fix the position of said final drive gears.

When flush handle 14, FIG. 2, is depressed the flo-control flush linkage 24, elevates the actuator lever flush extension 106, FIG. 3B and FIG. 4, Connected by means of a lever connector 107, causing a actuator lever 104, to move in a downward motion between a lower actuator guide 117, and a upper actuator guide 118, FIG. 5, by means of a beveled surface 105, pushing a hold/release lever 110 rearward. The hold/release lever 110, is connected to and positioned by means of two retainer pins 109 FIG. 6, mated to two retainer slots 116, in a hold/release lever receiver 115, molded into the preferred embodiment of the flo-control body, FIGS. 3A and 5, and a hold/release lever spring 112, composed of a non corrosive material of sufficient diameter wire to provide a slight forward tension FIG. 3A, held in position by two spring pins 113. One spring pin 113, being molded to the rear most center within the hold/release lever receiver 115, and the other spring pin 113, molded to the centered rear most end of the hold/release lever 110. The passing of the beveled surface 105, against a mated beveled surface 111, of the actuator lever 104, forces the hold/release lever 110, to move rearward into the hold/release lever receiver 115. After the actuator lever 104, pushes past the hold/release lever 110 in a downward motion, said lever 110, by means of tension supplied by the hold/release lever spring 112, moves forward resting on top of actuator lever 104 holding actuator lever 104 in its down most position. Simultaneously actuator lever 104, unseats and holds open the flo-control valve stopper 58, in the same downward motion. When the flush handle 14 is released it returns to its normal resting position allowing the actuator lever 104, by means of tension of the flo-control valve spring 56, to be pushed upward causing the hold/release lever 110, to gearably engage a gear rack 114, molded to the upper most surface of said hold/release lever 110 FIG. 6, to the final drive double thread worm gear 100, thereby holding the flo-control valve stopper 58, open.

The drive impeller 80, is caused to rotate by means of the force of water flowing through the impeller drive flow chamber 68. The rotational energy delivered to the final drive double thread worm gear 100, being gearably linked to said drive impeller 80, as heretofore described causes the hold/release lever 110, to retract into the hold/release lever receiver 115, by means of said gear rack 114, thereby releasing the actuator lever 104. Upon release, the actuator lever 104, is repositioned above said hold/release lever 110, by means of elevation due to the upward movement of the flo-control valve stopper 58, being reseated by means of the force of the flo-control valve spring 56, and the water pressure terminating the flow of water completing the flush cycle. During the time the flo-control valve stopper 58, is held open while the water passes through the impeller drive flow chamber 68, to the outlet by means of a upper body flow guide 65, molded within the flo-control body 66, at its upper most interior forcing the water out the water outlet 120, FIG. 5.

The reader will note that there are two ways in which the water can be delivered to the tank 10. The first and most obvious means to deliver water to the tank 10, a float assembly 122, illustrated in FIGS. 1 and 2. The second means to deliver water to the tank 10, is a water delivery chamber 125, FIG. 8, which will be discussed further on.

Section three is a float assembly 122, FIG. 1 and FIG. 2, attached to the present invention by means of a water outlet 120, at the upper most end of the flo-control valve 32, FIGS. 1 and 2, on line II—II of FIG. 3A, molded at the upper most portion of the preferred embodiment of the flo-control body 66, by means of mating thread of the lower most end of a float coupling 124 FIG. 7, to the thread of said water outlet 120, sealed with an o ring or other suitable gasket type or thread sealing material. Threading or bonding with a suitable bonding agent of the coupling 124, to the float valve inlet while eliminating a portion the older type extension tube from the float valve to the tank mount. Where the float valve is now connected to the flo-control valve 32, the siphon tube becomes a replenish tube 30, FIGS. 1, 2 and 8, which is removeably attached the a siphon tube nipple of the float assembly 122, for the purpose of replenishing the proper water level to the bowl 12.

The second means to deliver water to the tank 10, is a water delivery chamber 125, FIG. 8. The preferred embodiment of the water delivery chamber 125, FIG. 8, is a one piece mold of appropriate plastic material comprised of a chamber inlet 126, threaded to mate the flo-control water outlet 120. However, this system is simply a channeling device that directs the water downward towards the base of the tank for fill up by means of an water delivery chamber 127, and an chamber outlet 128, with an eliminator replenish tube nipple 130, at its upper most portion for removeably connecting a replenish tube 30. Said replenish tube 30, is attached to the over flow tube 26, by means of a replenish tube clip 132, to restore the water level in the bowl during fill up. With this optional water delivery chamber 125, attached to the flo-control valve 32, the flo-control will run to its full limit of 3½ gallons and shut off the water feed every time. In order to fill different capacity tanks the hold/release levers beveled surface 111, would have to be shortened or lengthened. That is to say for example if the hold/release lever 110, required to be retracted ⅜ of an inch for release to shut off the flo-control at 4½ gallons then it would be required to be retracted ⅛ of an inch to shut off at 1½ gallons. The length would have to be shortened ¼ inch for that adjustment. This would require at least three different size hold/release levers and each flo-control would be marked appropriately on its packaging as to its limit.

DETAILED DESCRIPTION OF THE MODIFIED VERSION OF THE INVENTION

The following description of a modified version of the invention for the purpose of easily adjusting the gallon per flush volume of the flo-control valve 32, is provided to enable any person skilled in the art to make and use the invention and sets forth the best modes contemplated by the inventor for those so skilled to do so. To coincide with this modified version of the invention the reader is referred to illustrations of FIGS. 1, 2, 3, 3B, 5, 5A, 7, 8, and FIGS. 9–9D. The reader will also note that being that this is a modified the numbers of the parts in the forgoing description that are not modified will remain the same, modified parts will have either an A extension or a number of their own.

FIG. 1 is a side view of a conventional toilet, of the type universally found in most homes in the United States and North America, which is fitted with a water limiting flo-control valve 32, in accordance with the present invention. In the conventional home toilet, a float valve assembly 122, comprising a float rod 9, and a float 11, FIGS. 1 and 2, mounted at the upper end of a float valve assembly 122, for closing the valve by means of linkage to the float 11, to the float valve with float rod 9, when the tank is filled to a predetermined level. In the present invention the float valve assembly 122, is affixed to the uppermost portion of the water limiting flo-control valve 32, by means of a float coupling 124.

The illustrated toilet comprises a toilet bowl 12, and a pedestal 13, with a tank 10, mounted over the rear extension of toilet bowl and pedestal 13. Water supply is introduced by means of a water feed line 34, which is connected by known means of a standard sized fitting, commonly used with flush tanks, providing a sealable mount to the tank 10, and a inlet fitting 36, of the water limiting flo-control valve 32. Water received in tank 10 which exceeds the tank's design capacity spills into an overflow tube 26, wherefrom it is discharged to the bowl 12. The main tank outlet 22, is normally closed by a flapper 20. When water from overflow tube 26, and tank outlet 22, is introduced into toilet bowl 12, the level of water in bowl 12, is raised until it exceeds the waste outlet of a flush trap 28, causing the water to flow from bowl 12, by siphoning action. Water, and waste products, continue to flow from bowl 12, as long as sufficient water enters bowl 12.

FIG. 2 is a top plan view of the principal portion of the toilet tank of FIG. 1 with the lid removed, illustrating the position of a flapper 20, along line I—I of FIG. 1 and the position of the water limiting flo-control valve 32 to the left most bottom portion of the tank 10. A flush handle 14, located in the upper left front area of the tank 10, is depressed to activate the flushing operation of the toilet. When depressed the flush handle raises a flush rod 16, opening a flapper 20, by means of a flapper flush linkage 18, simultaneously said flush rod 16, by means of a flo-control flush linkage 24, connected to a actuator lever flush extension 106 illustrated in FIG. 9C, activates the water limiting flo-control valve 32, allowing water to flow to the tank 10.

FIGS. 3, 3B and FIG. 9 are illustrations of assembled components of the water limiting flo-control valve 32, the Automatic Water Limiting, Supply Shut Off Safety Valve system according to the preferred embodiment of the present invention. The preferred embodiment is intended to limit the passing of up to 3.5 gallons of water by volume to the tank 10, and to shut off the water supply. FIGS. 9–9B illustrate a modified water volume adjustable releasing mechanism for releasing a flo-control valve stopper 58, by means of a slotted disk 140, and a volume adjusting peg 150. FIGS. 9C and 9D illustrate a actuator lever 154, for use with the modified water volume adjustable mechanism.

The preferred embodiment of the present modified invention is molded in three sections of a plastic material that may be sealed when joined with o rings or other suitable gasket type threading seal or bonding material of the manufacturers choice. Section one illustrated in FIG. 3, being the assembled parts of a inlet fitting 36, comprised of a water inlet chamber 38, fitted with a particle screen 40, for trapping any foreign particles that may enter the water supply. Slightly above said inlet chamber 38, molded in the embodiment of the inlet fitting is a back flow prevention chamber 42. A back flow seat 44 is centered in said back flow chamber with a minimum ¼ inch diameter opening for water flow between the inlet chamber 38, and the back flow prevention chamber 42. Freely sitting on said back flow seat 44, is a back flow check ball 46, made of sufficient rubberized or metal material as to be non corrosive, non-buoyant and of sufficient diameter so as to block the opening for the water flow to prevent back-flow without becoming lodged. During water flow, the force of the water will lift the back flow check ball 46, off the back flow seat 44, allowing free flow of the water through the system. When water flow stops or at any time should the water supply lose its pressure the water will cease to flow causing the back flow check ball 46, directed by the tapered wall of the back flow prevention chamber 42, to reseat itself preventing reverse flow of water. At the center portion of back flow prevention chamber 42, a mounting flange 48, of the standard size to fit the receiving hole of the toilet tank 10, fitted with a standard size flange seal 50, of appropriate material between a mounting flange 48, and the tank 10, is affixed or mounted to said tank 10, by means of the standard flange nut not shown for obvious reason.

Threaded into the upper most end of the inlet fitting 36, and sealed by means of suitable plumber joint material or bonding material is a flo-control inlet coupling 52. A flo-control valve stopper 58, fitted with a o ring seal 60, is attached to a open cross spring retainer pin 54, of a flo-control inlet coupling 52, by means of a flo-control valve spring 56, preferably made of a non corrosive material such as stainless steel of sufficient diameter wire to create enough upward pressure to seat and hold said flo-control valve stopper 58, in its closed position while still allowing the flo-control valve stopper 58, to be unseated without excessive force.

The upper most portion of the flo-control inlet coupling 52, is threaded and sealed by means of plumber joint material into a coupling receiver 53. The flo-control valve stopper 58, is positioned vertically within the center most portion of a flo-control chamber 62, of preferred embodiment of the flo-control body 66. FIG. 3A.

Section two preferably molded of a plastic material in two pieces, illustrated in FIG. 9, FIG. 3 B, FIG. 5, and FIG. 5A, comprises a flo-control body 66, and a flo-control cover 72, that is sealed by placing a flo-control body seal 78, between the flo-control cover 72, and the flo-control body 66, and placing a actuator o ring 108, in a actuator receiver 77, prior to aligning the actuator with a cover actuator hole 76, then snapping the flo-control cover 72, in place. Sealing of the housing is necessary to create driving water flow and to meet the plumbing requirements for "anti-siphoning". The composition used for flo-control body 66, would be of a moldable plastic material the manufacturers choice. The flo-control cover 72, FIG. 5, is snapped into place by means of a set of flo-control cover guides 73, mated to said guides by means of a matching set of cover guide receivers 74, held in place by a body/cover locking ridge 7. Said flo-control cover 72, aids in directing the flow of water by means of a cover flow guide 75, that aid in driving the rotation of a drive impeller 80.

Mating of the flo-control valve stopper 58, and a flo-control valve o ring 60, to a flo-control valve seat 64, is accomplished by means of threading the flo-control inlet coupling 52, into the lower most portion of the flo-control chamber 62, of the preferred embodiment of the flo-control body 66, thereby extending the upper most portion of the flo-control valve stopper 58, through the upper most portion of the flo-control chamber 62, between the walls of a lower actuator guide 117.

When unseated by means of a actuator lever 154, the flo-control valve stopper 58, allows water to flow past said flo-control valve stopper 58 into the upper most portion of the flo-control valve chamber 62, and on into a impeller drive flow chamber 68, FIGS. 3A and 3B directed by means of a lower body flow guide 63, FIG. 5, creating an opening between said chambers. Preferably molded of a plastic material the components of the impeller drive flow chamber 68, are comprised of a impeller drive flow chamber base plate 69, a flo-control cover 72 seals the flow chamber when snapped into place as previously described. The impeller drive flow chamber base plate 69, directs the flow of water by means of a split flow guide 70, located at the lower most portion of base plate 69, which forces the flow of water to turn a drive impeller 80. The split flow guide 70, FIG. 3 B, is comprised of two parallel walls of sufficient and equal extension at a 90 degree angle outwardly from the face of the impeller drive flow chamber base plate 69, so as to allow sufficient space to form a chamber when covered with said flo-control cover 72, to allow free wheeling of a drive impeller 80. A spacing peg 71, of equal extension molded to the uppermost end of base plate 69, opposite the split flow guide 70, assures equal distance between said impeller drive flow chamber base plate 69, and the flo-control cover 72, at all points.

The impeller drive flow chamber 68, houses the drive impeller 80, FIG. 3B, molded as a one piece unit with a primary drive worm gear 82, to the rear most portion of its center. The primary drive worm gear 82, is centered and mounted through said impeller drive flow chamber base plate 69, by means of a impeller drive shaft 84, composed of a non corrosive metal, mounted horizontally from front to rear with a slotted disk 140, solidly molded to a spur gear 142, mounted to the rear of the primary drive worm gear 82, between a drive shaft receiver 85, recessed in the inside of the flo-control cover 72, and a body drive shaft receiver 94, recessed in the inside of the flo-control body 66, locked in a certain position on said impeller drive shaft 84, by means of a retainer ring 86, as shown in FIG. 3B and FIG. 9. Said impeller 80, solidly connected to primary drive worm gear 84, is caused to rotate by means of the force of water flow through the impeller drive flow chamber 68, against a impeller fin 81, in the flow path. The impeller fins 81, are evenly space to insure a fin will enter the flow path as a fin leaves the flow path maintaining a constant rotation of the drive impeller 80, during water flow with a minimum of four fins in the flow path at all times FIG. 3B.

A primary drive worm gear 82, engages a secondary drive helical gear 88, solidly molded as a one piece unit with a secondary drive worm gear 90, of a suitable material. Said secondary helical gear meshes with said primary drive worm gear 82, at its 90 degree right center horizontally. Said secondary worm gear 90, is vertically positioned by means of a secondary drive gear bracket 92. Two secondary drive gear brackets 92, mounted horizontally parallel to each other, one above the other, spaced a sufficient distance apart so as to accommodate the length and fixing the position of said secondary drive helical gear 88, and secondary drive worm gear 90. Said secondary drive gear brackets 92, are mounted from front to back by means of a secondary drive bracket mount 96, molded into the rear most side of the impeller drive flow chamber base plate 69, and the front most inside of the rear wall of the flo-control body 66, illustrated in FIG. 3A.

A secondary drive worm gear 90, then engages a final drive helical gear 98, solidly molded as a one piece unit with a intermediate drive spur gear 134, of a suitable material. Said final drive helical gear 98, meshes with said secondary worm gear 90, at its center 90 degrees to its left and centered above said primary worm gear 82. Final drive helical gear 98, and intermediate spur gear 134, are vertically positioned from front to rear by means of two final drive gear shaft studs 102, one being molded to the rear side of the impeller drive flow chamber base plate 69, 180 degrees horizontally to the other being molded to the front inside of the rear wall of the flo-control body 66, spaced a sufficient distance apart so as to accommodate the length and fix the position of final drive helical gear 98, and intermediate spur gear 134.

Intermediate spur gear 134, drives a tapered face spur gear 136, held in the engaged position by means of a spring 139, mounted to the embodiment of the flo-control body 66, by means of a jack shaft 138. Solidly molded on one face of the tapered face spur gear 136, is a tapered rise 137, FIG. 9. When engaged tapered face spur gear 136, drives a spur gear 142, solidly connected to a slotted disk 140, mounted on a impeller drive shaft 84, to the rear of the primary drive worm gear 82. The slotted disk 140, FIG. 9A, comprises a actuator release slot 146, FIG. 9A, the means which allows opening and closing of the flo-control valve stopper 58. The adjustment of gallons allowed from 1.5 gallons to 3.5 gallons is accomplished by means of a volume adjusting slot 148, and a volume adjusting peg 150, FIG. 9B. There are three volume adjusting pegs of a different diameter to fit the volume adjusting slot 148, allowing the slotted disk 140, to turn when the toilet is flushed to the limit set by the peg 150, inserted into a adjusting peg receiver 152, illustrated in FIGS. 9, and 9A, sealed with a adjusting peg o ring 153. The slotted disk 140, is held in the valve closed position by means of a actuator foot 156, of the actuator 154, illustrated in FIGS. 9C and 9D, mated to the actuator release slot 146, FIG. 9A. The actuator lever 154, of the modified valve control mechanism is comprised of a actuator foot 156, a tapered spur gear push 158, and a start spring receiver hole 145. A start spring receiver hole 145, is also located in the slotted disk 140. When the flush handle 14, of the toilet is depressed the slotted disk 140, is released by the actuator foot 156 and the disengaging of the tapered face spur gear 136, by means of pushing rearward on said tapered rise 137, from said actuator gear push 158 means, and is rotated to the limit of the selected volume adjusting peg 150, by means of a start spring 144, inserted into the slotted disk 140, and the actuator lever 154, by means of the start spring receiver hole 145, simultaneously dislodging and opening the actuator valve 58. When the flush handle 14, is released the jack shaft spur gear re-engages. The actuator valve is held open by the slotted disk until the selected volume of water rotates the actuator release slot 146, over the actuator foot 156, by means of the gearably linked drive impeller thereby allowing the flo-control valve stopper 58, to close.

Those skilled in the art will appreciate that various adaptations and modifications of the just-described preferred embodiments which can be configured without departing from the scope and spirit of the invention. Therefore, it is to be understood that, within the scope of the appended claims, the invention may be practiced other than as specifically described herein.

What I claim to be secured by Letters Patent of the United States is:

1. A water limiting, automatic shutoff, back flow prevention, toilet fill flo-control valve (32) for use with a flush toilet tank (10) comprising:
    a flo-control body (66),
    a flo-control cover (72), said flo-control cover (72) being sealed to said flo-control body (66) so as to be capable of mounting below a water line in the toilet tank (10),
    a flo-control valve stopper (58) means mounted within said flo-control body (66) for shutting off or permitting water flow,
    a hold/release lever (110) means to hold said flo-control valve stopper (58) means open, and release the flo-control valve stopper (58) means to a closed position,
    a drive impeller (80) means mounted in said flo-control body (66) for producing rotational energy,
    an impeller drive flow chamber (68) means for directing flow of water to drive said drive impeller (80) means,
    a means for gearably coupling rotational energy from said drive impeller (80) means to said hold/release lever (110) means,
    an inlet means (36) attached to said flo-control body (66) for mounting said flo-control body (66) in the flush toilet tank (10) and providing a connection to a source of water (34) under pressure,
    a particle screen means (40) for screening foreign particles from entering said inlet means (36),
    a back flow check ball (46) means for preventing back flow within said inlet means (36),
    an outlet means (120) on said flo-control body (66) for coupling to a float valve (122) or to a water delivery chamber (125) means,
    a replenish tube (30) means to replenish the water level in a toilet bowl (12) during flush when said water delivery chamber (125) means is used,
    a replenish tube clip (132) means for attaching said replenish tube (30) means to a toilet over flow tube (26),
    a delivery chamber outlet (128) means for directing water from said water delivery chamber (125) means to and towards the bottom of the toilet tank (10) for fill up,
    an actuator lever (104) means for initiating operation of said flo-control valve (32),
    an actuator lever flush extension (106) means to link the actuator lever (104) means to a toilet flush rod (16) means,
    whereby when said toilet flush rod (16) means is depressed said actuator lever (104) means will open said flo-control valve stopper (58) means, and cause said hold/release lever (110) means to hold said flo-control valve stopper (58) means open allowing flow of water to rotate said drive impeller (80) means thereby retracting said hold/release lever (110) means allowing said flo-control valve stopper (58) means to close terminating the flow of water after allowing a predetermined volume of water to pass through the flo-control valve (32).

2. The water limiting, automatic shutoff, back flow prevention, toilet fill flo-control valve (32) as claimed in claim 1 wherein said means for gearably coupling further comprises:
    a primary drive worm gear (82) solidly connected to said drive impeller (80) means, said worm gear (82) lying along and centered on an axis of rotation of said drive impeller (80) means, an impeller drive shaft (84), said drive shaft (84) disposed on said axis of rotation of said drive impeller (80) and said primary drive worm gear (82) between said flo-control body (66) and said flo-control cover (72),
    a secondary drive helical gear (88) solidly connected to a secondary drive worm gear (90), said secondary drive helical gear (88) being transverse to said axis of rotation of said drive impeller (80) means, having said secondary drive helical gear (88) at its lower aspect and having said secondary drive worm gear (90) at its upper aspect, said secondary drive helical gear (88) rotatably meshed with said primary drive worm gear (82),
    a final drive helical gear (98) solidly connected to a final drive worm gear (100), being transverse to the axis of rotation of said secondary drive worm gear (90) and having said final drive helical gear (98) at its forward most aspect and having said final drive worm gear (100) at its rear most aspect, said final drive helical gear (98) rotatably meshed with said secondary drive worm gear (90), and
    a gear rack (114) means solidly molded to said hold/release lever (110) means to slidably retract said hold/release lever (110) within a hold/release lever receiver (115) means, said hold/release lever receiver (115) means being molded within said flo-control body (66).

3. The water limiting, automatic shutoff, back flow prevention, toilet fill flo-control valve (32) as claimed in claim 1 wherein said impeller drive flow chamber (68) means further comprises:
    an impeller drive flow chamber base plate (69), said impeller drive flow chamber base plate (69) having molded to its lower front most surface a split flow guide (70) means for directing the flow of water to impart rotation of said drive impeller (80), and having molded to said chamber base plate's (69) upper front most surface a spacing peg (71) means for evenly sandwiching said chamber base plate (69) between said flo-control cover (72) and said flo-control body (66).

4. The water limiting, automatic shutoff, back flow prevention, toilet fill flo-control valve (32) as claimed in claim 1 wherein said flo-control valve stopper (58) means further comprises:
- a flow-control valve spring (56) means, said flow-control valve spring (56) means urging the closing of said flo-control valve stopper (58),
- an open cross spring retainer pin (54) means, said open cross spring retainer pin (54) means to retain sandwiching of said valve spring between said retainer pin and said flo-control valve stopper (58), and
- a flo-control valve seat (64) means, said flo-control valve seat (64) means for terminating flow of water when said flo-control valve stopper (58) is released to its closed position.

5. The water limiting, automatic shutoff, back flow prevention, toilet fill flo-control valve (32) as claimed in claim 1 wherein said hold/release lever (110) means further comprises:
- a hold/release lever spring (112),
- a set of spring pins (113),
- a gear rack (114) means
- a hold/release lever receiver (115), and
- a mated beveled surface (111),
- whereby said hold/release lever spring (112) is positioned between said spring pins (113) of said hold/release lever receiver (115) and said hold/release lever (110) for springfully extending and retracting said hold/release lever (110) within said hold/release lever receiver (115), thereby allowing said mated beveled surface (111) and gear rack (114) means to slidably retract said hold/release lever (110) when pressure is exerted by said actuator lever (104) means and gear rack (114) means.

6. The water limiting, automatic shutoff, back flow prevention, toilet fill flo-control valve (32) as claimed in claim 1 wherein said flo-control body (66) is connectively threaded at its lower most inlet (53) by means of a flo-control inlet coupling (52) to a back flow prevention chamber (42).

7. The water limiting, automatic shutoff, back flow prevention, toilet fill flo-control valve (32) as claimed in claim 1 wherein said back flow prevention chamber (42) further comprises:
- a back flow check ball (46) of suitable non buoyant material,
- a back flow seat (44), and
- a particle screen of suitable non corrosive material
- whereby said back flow check ball (46) means will rest upon said back flow seat (44) when water pressure is lost or stopped by closing of said flo-control valve stopper (58) means, thereby stopping any back flow of water, while said particle screen prevents entry of foreign solid matter.

8. The water limiting, automatic shutoff, back flow prevention, toilet fill flo-control valve (32) as claimed in claim 1 wherein said flo-control body (66) inlet means (36) is connected to an outlet of said back flow prevention chamber (42) means for mounting the flo-control valve (32) in a toilet tank (10) and providing a connection to the source of water (34) under pressure.

9. The water limiting, automatic shutoff, back flow prevention, toilet fill flo-control valve (32) as claimed in claim 1 wherein said flo-control body (66) has an outlet (120) means attached to said flo-control body (66) for mounting the float valve (122) or the water delivery chamber (125) means to deliver water to a lower portion of said toilet tank (10) and through said replenish tube (130) to said toilet over flow tube (26) to replenish water level within the toilet bowl.

10. The flo-control valve (32) of claim 1 wherein said actuator lever (104) is mounted through said flo-control body (66) as means to disengage a gear rack (114) means of said hold/release lever (110) from said final drive worm gear opening said flo-control valve stopper (58), while providing means to connect to an actuator lever flush extension (106).

11. The flo-control valve (32) of claim 1 wherein said actuator lever flush extension (106) is flexibly linked to the toilet flush rod (16) and a flush handle (14) secured to the toilet flush rod (16).

12. The flo-control valve (32) of claim 1 wherein said flo-control valve (32) is modified wherein said hold/release lever (110) means is replaced for the purpose of volume selectivity comprising:
- an actuator foot (156) means to open said flo-control valve stopper(58),
- a slotted disk (140) means to hold open and release said flo-control valve stopper (58),
- a final drive spur gear (134) means, said final drive spur gear (134) means solidly connected to said a final drive helical gear (98) means to gearably connect said slotted disk to said drive impeller (80),
- a slotted disk spur gear (142) to gearably connect said final drive spur gear (134) means,
- a flo-control valve release slot (146) means, said flo-control valve release slot (146) means molded from a perimeter of said slotted disk (140) inwards towards its center a sufficient distance to accommodate release of said flo-control valve stopper (58),
- a volume adjusting peg (150) means to limit maximum rotation of said slotted disk (140) for setting a desired volume of water,
- a tapered face gear (136) means, said tapered face gear (136) means to provide disconnect and engagement of said slotted disk spur gear (142) means to said final drive spur gear (134) means,
- a jack shaft (138) means, solidly mounted to said flo-control body (66), said jack shaft (138) means to provide a slidably rotatable mount for said tapered face gear (136),
- a jack shaft spring (139) means to provide tension for disconnect and engagement of said tapered face gear (136) means,
- a start spring (144) means, said start spring (144) means to rotate said slotted disk (140) to a limit selected by said volume adjusting peg (150), and
- a volume adjusting slot (148), said volume adjusting slot (148) being molded within a face of said slotted disk (140) adjacent to the perimeter of the slotted disk (140), and notched in steps equivalent to a diameter of said volume adjusting pegs (150), so that a size of the pegs (150) determines a position at which the slotted disk (140) stops, whereby, said flo-control valve stopper (58) of said modified flo-control valve (32) will be dislodged by said actuator foot (156) when activated by the flush rod (16), simultaneously causing said tapered face gear (136) means to gearably disconnect to said slotted disk (140) allowing said slotted disk (140) to rotate to the position set by said volume adjusting peg (150) and holding open said flo-control valve stopper (58) thereby allowing flow of water to rotate said drive impeller (80), when said flush rod (16) is released said slotted disk (140) will reconnect to said final drive spur gear (134), gearably connected said slotted disk (140), thereby rotating said flo-control valve release slot (146) means of said slotted disk (140) over said flo-control valve stopper (58) causing the stopper (58) to close limiting a selected amount of water by volume to pass to the toilet tank (10) providing positive shutoff of the water, when closed said flo-control valve stopper (58) doubles as an additional back flow prevention (42) device in conjunction with the back flow prevention chamber (42) of the inlet fitting.

* * * * *